(12) United States Patent
Yumura (10) Patent No.: US 9,550,431 B2
(45) Date of Patent: Jan. 24, 2017

(54) WORKING MACHINE

(71) Applicant: SUMITOMO HEAVY INDUSTRIES, LTD., Tokyo (JP)

(72) Inventor: Masanori Yumura, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 321 days.

(21) Appl. No.: 14/309,052

(22) Filed: Jun. 19, 2014

(65) Prior Publication Data

US 2015/0039151 A1     Feb. 5, 2015

(30) Foreign Application Priority Data

Jul. 30, 2013     (JP) .................. 2013-157225

(51) Int. Cl.
   *B60L 11/00*     (2006.01)
   *H02J 7/00*      (2006.01)
   *B60L 11/18*     (2006.01)

(52) U.S. Cl.
   CPC .......... *B60L 11/1861* (2013.01); *H02J 7/00* (2013.01); *B60L 2200/40* (2013.01); *B60L 2200/42* (2013.01); *Y02T 10/705* (2013.01); *Y02T 10/7005* (2013.01); *Y02T 10/7038* (2013.01); *Y02T 10/7044* (2013.01)

(58) Field of Classification Search
   None
   See application file for complete search history.

(56) References Cited

U.S. PATENT DOCUMENTS

| | | | |
|---|---|---|---|
| 6,788,069 B2 * | 9/2004 | Vacher | B60L 11/1851 320/162 |
| 7,406,389 B2 * | 7/2008 | Emori | B60W 10/26 702/183 |
| 8,008,891 B2 * | 8/2011 | Yun | B60L 11/1861 320/132 |
| 8,154,299 B2 * | 4/2012 | Iida | G01R 31/3679 320/132 |
| 8,378,638 B2 | 2/2013 | Majima | |
| 8,598,942 B2 * | 12/2013 | Kawashima | G01R 19/32 327/513 |

(Continued)

FOREIGN PATENT DOCUMENTS

| | | |
|---|---|---|
| JP | 2007-155586 A | 6/2007 |
| JP | 2009-031220 A | 2/2009 |

(Continued)

*Primary Examiner* — Leigh Garbowski
(74) *Attorney, Agent, or Firm* — Squire Patton Boggs (US) LLP (57) ABSTRACT

An electric motor drives a drive target and generates electricity. A charge-discharge control circuit controls charging and discharging of a power storage device. A controller controls a charge-discharge control circuit. The controller obtains a calculation value of an internal resistance of the power storage device based on a measured value of an open circuit voltage of the power storage device, and a measured value of an inter-terminal voltage and a measured value of a charge-discharge current when the power storage device is charged and discharged, and obtains a correction value of the internal resistance by correcting the calculation value of the internal resistance based on the measured value of the open circuit voltage.

7 Claims, 10 Drawing Sheets

(56) References Cited

U.S. PATENT DOCUMENTS

| | | | | |
|---|---|---|---|---|
| 8,798,832 | B2* | 8/2014 | Kawahara | H01M 10/441 |
| | | | | 701/22 |
| 2009/0033292 | A1 | 2/2009 | Majima | |
| 2011/0313613 | A1* | 12/2011 | Kawahara | H01M 10/441 |
| | | | | 701/34.4 |
| 2013/0080096 | A1* | 3/2013 | Toki | G01R 31/3624 |
| | | | | 702/63 |
| 2013/0325379 | A1* | 12/2013 | Nakamura | G01R 31/362 |
| | | | | 702/63 |
| 2014/0184166 | A1* | 7/2014 | Ohkawa | H01M 10/441 |
| | | | | 320/134 |
| 2014/0225622 | A1* | 8/2014 | Kudo | B60L 3/0046 |
| | | | | 324/433 |

FOREIGN PATENT DOCUMENTS

| | | | | |
|---|---|---|---|---|
| WO | WO2012/169062 | A1 * | 12/2012 | H02J 7/11 |
| WO | WO2013/035183 | A1 * | 3/2013 | H02J 7/02 |

* cited by examiner

WORKING MACHINE

INCORPORATION BY REFERENCE

Priority is claimed to Japanese Patent Application No. 2013-157225, filed Jul. 30, 2013, the entire content of which is incorporated herein by reference.

BACKGROUND

Technical Field

The present invention relates to a working machine on which a power storage device is mounted.

Description of the Related Art

In the related art, a working machine which drives an electric motor by electric energy charged in a power storage device is disclosed. A state of charge SOC of the power storage device is used for controlling the working machine. When an electric double layered capacitor, a lithium ion capacitor, or the like is used in the power storage device, the state of charge SOC is represented by the square of a ratio between an open circuit voltage and a maximum rated voltage of the power storage device.

In order to remove influence of voltage drop due to an internal resistance to measure the open circuit voltage of the power storage device, a charge-discharge current of the power storage device should be 0. Accordingly, when the charging and discharging of the power storage device is performed, the open circuit voltage of the power storage device cannot be measured. Instead of a measured value of the open circuit voltage, the state of charge SOC of the power storage device can be obtained using a calculation value of the open circuit voltage which is obtained by using measured values of the internal resistance and an inter-terminal voltage, and a measured value of the charge-discharge current.

The internal resistance used in the calculation of the state of charge SOC is obtained at the time of starting of the working machine. Hereinafter, a method for obtaining the internal resistance will be described. When the working machine is started, the open circuit voltage is measured in a state where the charge-discharge current of the power storage device is set to 0. Thereafter, charging to the power storage device starts, and the inter-terminal voltage and the charging current are measured. The internal resistance can be obtained using the measured open circuit voltage, the inter-terminal voltage, and the charging current.

In the related art, a method of correcting the open circuit voltage according to an ambient temperature is disclosed. A charging rate of the power storage device is obtained using the corrected open circuit voltage.

SUMMARY

According to an embodiment of the present invention, there is provided a working machine including: an electric motor configured to drive a drive target and generate electricity; a power storage device; a charge-discharge control circuit which is configured to control charging and discharging of the power storage device and is connected to the electric motor; and a controller configured to control the charge-discharge control circuit. The controller obtains a calculation value of an internal resistance of the power storage device based on a measured value of an open circuit voltage of the power storage device, and a measured value of an inter-terminal voltage and a measured value of a charge-discharge current when the power storage device is charged and discharged. Moreover, the controller obtains a correction value of the internal resistance by correcting the calculation value of the internal resistance based on the measured value of the open circuit voltage.

According to another embodiment of the present invention, there is provided a working machine including: an electric motor configured to drive a drive target and generate electricity; a power storage device configured to supply electric power to the electric motor; a charge-discharge control circuit which is configured to control charging and discharging of the power storage device and is connected to the electric motor; and a controller configured to control the charge-discharge control circuit. The controller stores a value of an internal resistance at the time of a reference voltage of the power storage device. In addition, the controller obtains a charging state of the power storage device based on a measured value of an inter-terminal voltage and a measured value of a charge-discharge current when the power storage device is charged and discharged, and the value of the internal resistance at the time of the reference voltage.

DETAILED DESCRIPTION

A charging state obtained using measured values of a calculation value of an internal resistance of a power storage device, a measured value of an inter-terminal voltage, and a measured value of a charge-discharge current can be coincident with a charging state obtained using a measured value of an open circuit voltage. However, it is found that there is deviation between two states. It is considered that the deviation occurs because the calculation value of the internal resistance deviates from the measured value of the internal resistance.

In order to obtain a charging state at high accuracy, it is necessary to measure the open circuit voltage of a power storage device. However, it is difficult to measure the open circuit voltage while the charge-discharge current is set to 0 during operation of a working machine. There is a need for a method of obtaining the charging state at high accuracy without setting the charge-discharge current to 0.

It is desirable to provide a working machine capable of obtaining an internal resistance at high accuracy. It is also desirable to provide a working machine capable of obtaining a charging state using the internal resistance which is obtained at high accuracy.

By the calculation value of the internal resistance based on the measured value of the open circuit voltage, deviation of the calculation value of the internal resistance generated due to dependence of the internal resistance to a voltage is decreased. Accordingly, it is possible to compare values of the internal resistances, which are obtained at various conditions, with one another. Moreover, using a correction value of the internal resistance, it is possible to obtain the charging state of the power storage device without setting the charge-discharge current of the power storage device to 0 during the operation of the working machine.

Figure 1:
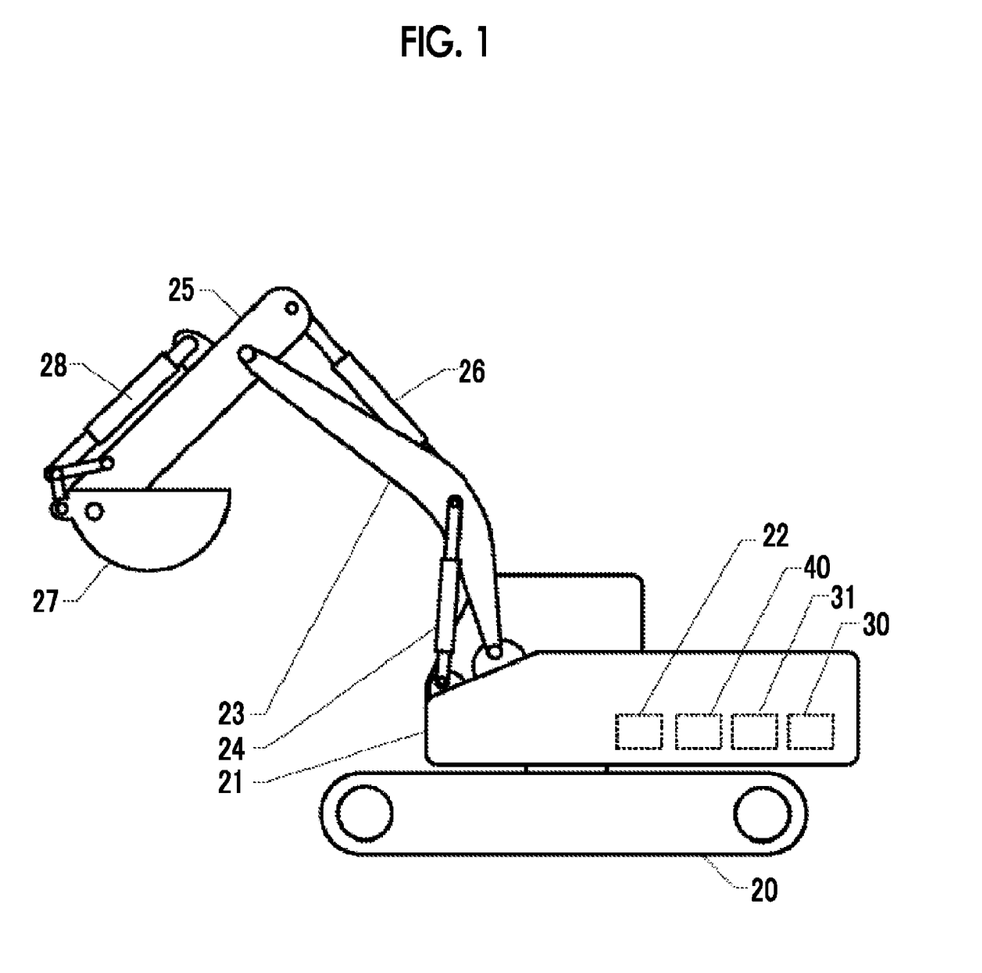
FIG. 1 is a side view showing a working machine according to an embodiment.

FIG. 1 is a side view of a shovel as an example of a working machine according to an embodiment. An upper rotary body 21 is mounted on a lower travelling body 20. A boom 23 is connected to the upper rotary body 21, an arm 25 is connected to the boom 23, and a bucket 27 is connected to the arm 25. A posture of the boom 23 is changed by expansion and contraction of a boom cylinder 24. A posture of the arm 25 is changed by expansion and contraction of an arm cylinder 26. A posture of the bucket 27 is changed by expansion and contraction of a bucket cylinder 28. The boom cylinder 24, the arm cylinder 26, and the bucket cylinder 28 are hydraulically driven.

A rotary electric motor 22, an engine 30, a motor generator 31, and a power storage circuit 40 are mounted on the upper rotary body 21. The motor generator 31 generates electricity by power of the engine 30. The generated electric power is charged in the power storage circuit 40. The rotary electric motor 22 is driven by the electric power from the power storage circuit 40, and rotates the upper rotary body 21. The motor generator 31 also operates as an electric motor and assists the engine 30. The rotary electric motor 22 also operates as a generator, and generates regenerative electric power from revolving kinetic energy of the upper rotary body 21.

Figure 2:
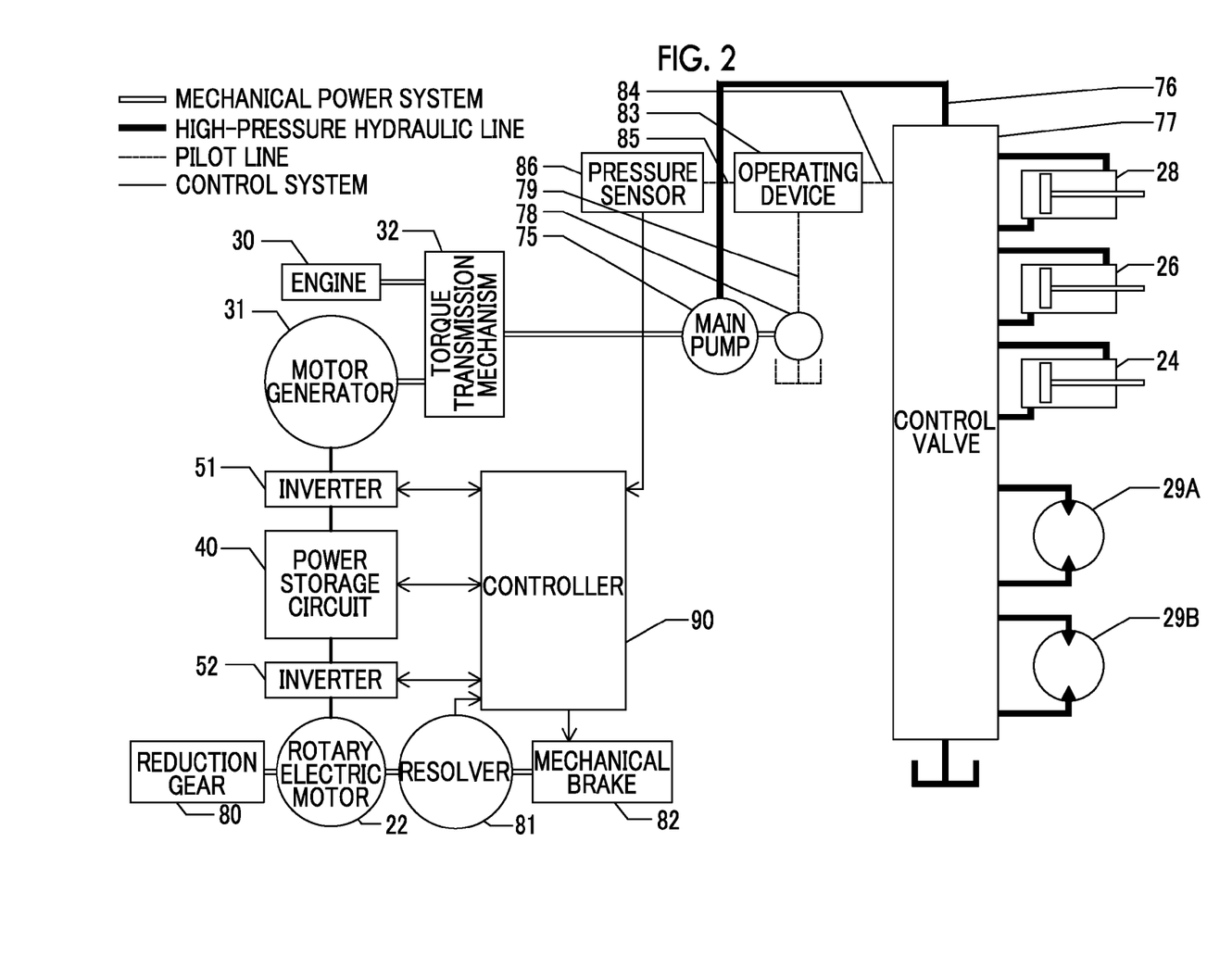
FIG. 2 is a block diagram of the working machine according to the embodiment.

FIG. 2 is a block diagram of the working machine according to the embodiment. In FIG. 2, a mechanical power system is indicated by a double line, a high pressure hydraulic line is indicated by a thick solid line, an electric control system is indicated by a thin solid line, and a pilot line is indicated by a dashed line.

A drive shaft of the engine 30 is connected to an input shaft of torque transmission mechanism 32. As the engine 30, an engine which generates a driving force by a fuel other than electricity, for example, an internal combustion engine such as a diesel engine is used.

A drive shaft of the motor generator 31 is connected to the other input shaft of the torque transmission mechanism 32. The motor generator 31 can perform both operation motions of electric (assist) operation and generating operation. The torque transmission mechanism 32 includes two input shafts and one output shaft. A drive shaft of a main pump 75 is connected to the output shaft. In a period when the motor generator 31 performs the assist operation, the main pump 75 becomes a drive target of a motor generator 31.

When a load applied to the main pump 75 is large, the motor generator 31 performs the assist operation, and the driving force of the motor generator 31 is transmitted to the main pump 75 via the torque transmission mechanism 32. Accordingly, the load applied to the engine 30 is decreased.

On the other hand, when the load applied to the main pump 75 is small, the driving force of the engine 30 is transmitted to the motor generator 31 via the torque transmission mechanism 32, and thus, the motor generator 31 is operated to generate electricity.

The main pump 75 supplies a hydraulic pressure to a control valve 77 via a high pressure hydraulic line 76. The control valve 77 distributes the hydraulic pressures to hydraulic motors 29A and 29B, the boom cylinder 24, the arm cylinder 26, and the bucket cylinder 28 by a command of an operator. The hydraulic motors 29A and 29B drive two right and left crawlers which are included in the lower travelling body 20 shown in FIG. 1.

The motor generator 31 is connected to the power storage circuit 40 via an inverter 51. The rotary electric motor 22 is connected to the power storage circuit 40 via an inverter 52. The inverters 51 and 52, and the power storage circuit 40 are controlled by a controller 90.

The inverter 51 performs an operation control of the motor generator 31 based on a command from the controller 90. Switching between the assist operation and the generating operation of the motor generator 31 is performed by the inverter 51.

In the period when the motor generator 31 performs the assist operation, the necessary electric power is supplied from the power storage circuit 40 to the motor generator 31 through the inverter 51. In the period when the motor generator 31 performs the generating operation, the electric power generated by the motor generator 31 is supplied to the power storage circuit 40 through the inverter 51. Accordingly, the power storage device in the power storage circuit 40 is charged.

The rotary electric motor 22 is AC-driven by the inverter 52, and can perform both operations of a power running operation and a regenerative operation. During the power running operation of the rotary electric motor 22, the electric power is supplied from the power storage circuit 40 to the rotary electric motor 22 via the inverter 52. The rotary electric motor 22 rotates the upper rotary body 21 (FIG. 1), which is a drive target, via a reduction gear 80. At the time of the regenerative operation, the rotary motion of the upper rotary body 21 is transmitted to the rotary electric motor 22 via the reduction gear 80, and thus, the rotary electric motor 22 generates the regenerative electric power. The generated regenerative electric power is supplied to the power storage circuit 40 via the inverter 52. Accordingly, the power storage device in the power storage circuit 40 is charged.

A resolver 81 detects a position of the rotating shaft of the rotary electric motor 22 in a rotation direction. The detected results of the resolver 81 are input to the controller 90. A mechanical brake 82 is connected to the rotating shaft of the rotary electric motor 22, and generates a mechanical braking force. A braking state and a releasing state of the mechanical brake 82 receive the control from the controller 90, and are switched by an electromagnetic switch.

A pilot pump 78 generates a pilot pressure required for the hydraulic operating system. The generated pilot pressure is supplied to an operating device 83 via a pilot line 79. The operating device 83 includes a lever or a pedal, and is operated by the operator. The operating device 83 converts a primary side hydraulic pressure supplied from the pilot line 79 into a secondary side hydraulic pressure according to the operating of the operator. The secondary side hydraulic pressure is transmitted to the control valve 77 via a hydraulic pressure line 84, and is transmitted to a pressure sensor 86 via another hydraulic pressure line 85.

The detected results of the pressure detected by the pressure sensor 86 are input to the controller 90. Accordingly, the controller 90 can detect states of the operations of the lower travelling body 20, the rotary electric motor 22, the boom 23, the arm 25, and the bucket 27 (FIG. 1).

Figure 3:
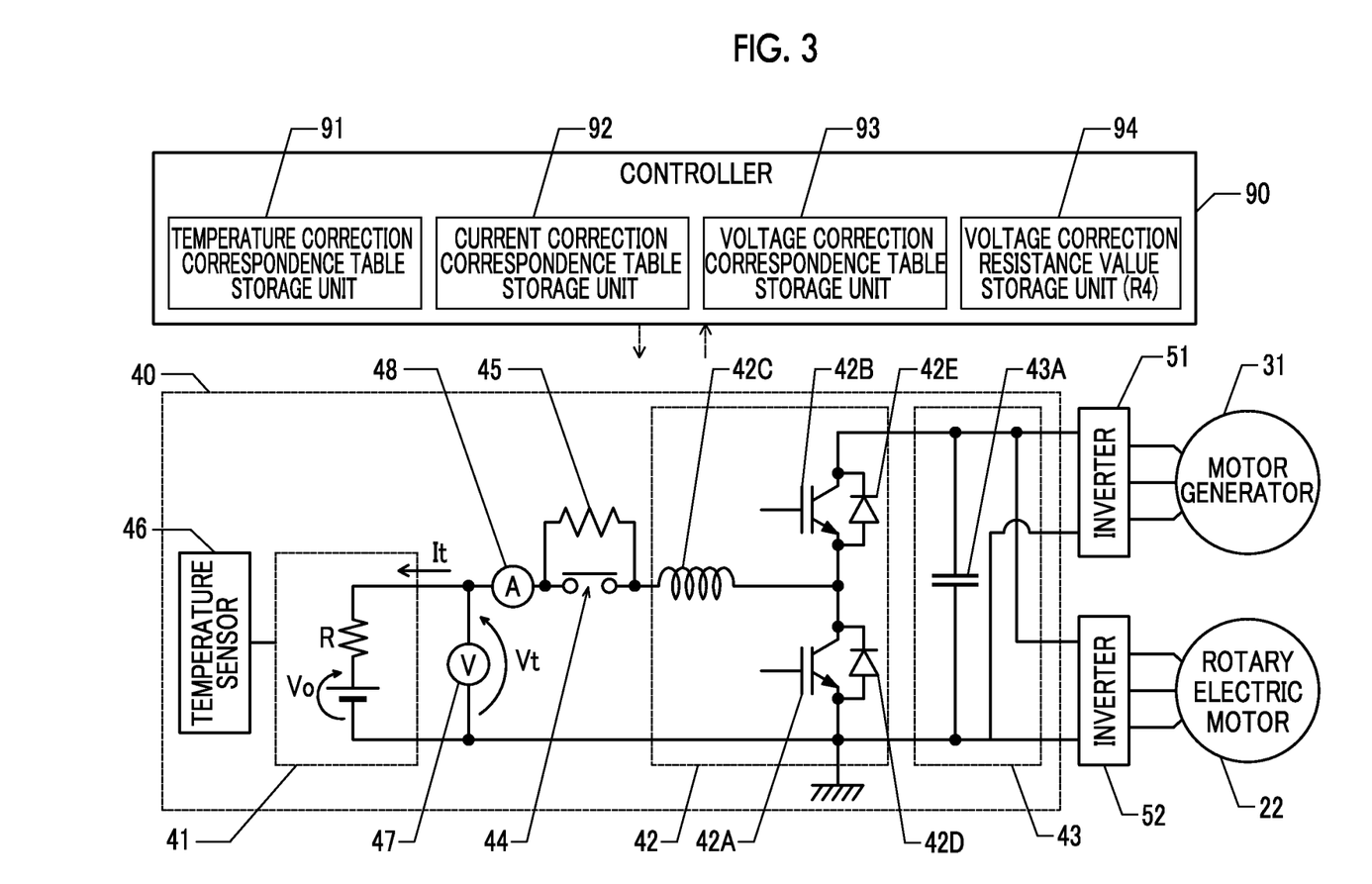
FIG. 3 is an equivalent circuit diagram of a power storage circuit mounted on the working machine according to the embodiment.

FIG. 3 shows an equivalent circuit diagram of the power storage circuit 40. The power storage circuit 40 includes a power storage device 41, a step-up and down converter (charge-discharge control circuit) 42, a DC bus line 43, a relay 44, a resistor 45, a temperature sensor 46, a voltage sensor 47, and a current sensor 48.

The power storage device 41 is connected to the DC bus line 43 via the relay 44 and the step-up and down converter 42. The DC bus line 43 is connected to DC terminals of the inverters 51 and 52. The motor generator 31 and the rotary electric motor 22 are connected to three-phase AC terminals of the inverters 51 and 52, respectively. A smoothing capacitor 43A is inserted between a high pressure line and a grounding line of the DC bus line 43.

The step-up and down converter 42 includes a series circuit between a step-up (discharging) switching element 42A and a step-down (charging) switching element 42B. The series circuit is connected between the high pressure line and a grounding line of the DC bus line 43. For example, an Insulated Gate Bipolar Transistor (IGBT) is used for the switching elements 42A and 42B. An interchange point between the step-up IGBT 42A and the step-down IGBT 42B is connected to a positive electrode terminal of the power storage device 41 via a reactor 42C and the relay 44.

Commutation diodes (free wheel diodes) 42D and 42E are connected in parallel with the step-up IGBT 42A and the step-down IGBT 42B. The controller 90 applies a Pulse Width Modulation (PWM) signal for control to gate electrodes of the step-up IGBT 42A and the step-down IGBT 42B.

The resistor 45 is connected in parallel with the relay 44. A negative electrode terminal of the power storage device 41 is grounded. The controller 90 performs an ON-OFF control of the relay 44. During a normal operation, the relay 44 is in an ON state.

Hereinafter, the step-up operation (discharging operation) will be described. The PWM voltage is applied to the gate electrode of the step-up IGBT 42A. At switching of the step-up IGBT 42A, the inter-terminal voltage of the power storage device 41 is stepped-up by an induced electromotive force generated by the reactor 42C, and thus, a discharging current flows out from the output terminal via the commutation diode 42E.

Next, the step-down operation (charging operation) will be described. The PWM voltage is applied to the gate electrode of the step-down IGBT 42B. At switching of the step-down IGBT 42B, the power storage device 41 (FIG. 3) is charged via the commutation diode 42D by the induced electromotive force generated by the reactor 42C.

The current sensor 48 measures the charge-discharge current which flows through the reactor 42C. The voltage sensor 47 measures the inter-terminal voltage of the power storage device 41. The temperature sensor 46 measures the temperature of the power storage device 41. The measured results are input to the controller 90.

When the voltage generated in the DC bus line 43 is lower than the inter-terminal voltage of the power storage device 41, the relay 44 is turned off. At this time, the power storage device 41 is discharged via the resistor 45, the reactor 42C, and the commutation diode 42E, and thus, the voltage of the DC bus line 43 is stepped up. The resistor 45 prevents an excessive discharging current from flowing.

The controller 90 controls the step-up and down converter 42 so that the voltage of the DC bus line 43 is maintained at a value within a target range. Specifically, the charging and discharging of the power storage device 41, and the step-up and down of the DC bus line 43 are performed. In addition, during the operation of the shovel, if the state of charge SOC of the power storage device 41 is less than or equal to a reference value of a lower limit, the controller 90 performs the control when the state of charge SOC is within the target range. For example, the motor generator 31 is operated to generate electricity, and thus, the power storage device 41 is charged.

According to the operation of the hydraulic system by the main pump 75, the operation of the upper rotary body 21 by the rotary electric motor 22, and the all shovel operations such as states of the assisting operation and the generating operation of the motor generator 31, the voltage of the DC bus line 43 and the state of charge SOC of the power storage device 41 are changed. The state of charge SOC of the power storage device 41 can be obtained at high accuracy so that the controller 90 appropriately controls all shovel operations.

The controller 90 includes a temperature correction correspondence table storage unit 91, a current correction correspondence table storage unit 92, a voltage correction correspondence table storage unit 93, and a voltage correction resistance value storage unit 94.

Figure 4:
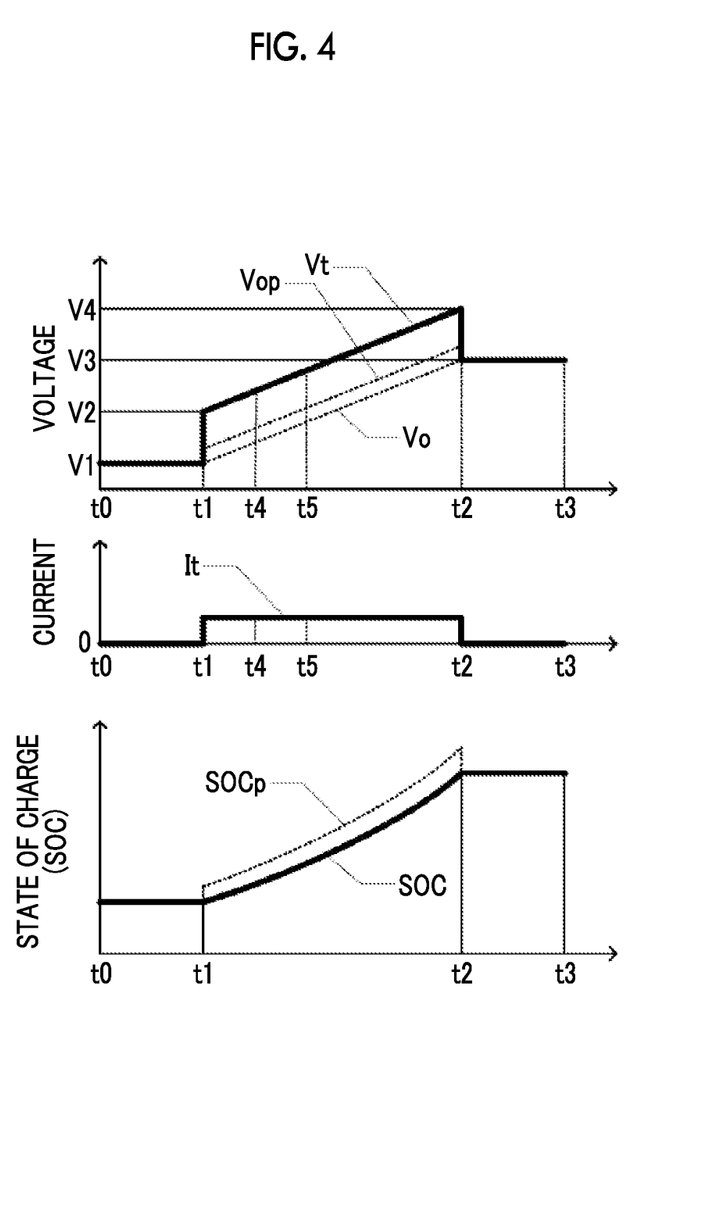
FIG. 4 is a graph showing examples of time changes of an inter-terminal voltage Vt, a charge-discharge current It, and a charging state during a charging period of a power storage device.

FIG. 4 is a graph showing examples of time changes of the inter-terminal voltage Vt, the charge-discharge current It, and the state of charge SOC during the charging period of the power storage device 41 (FIG. 3). The charging current is set to positive and the discharging current is set to negative. During a period from a time t0 to a time t1, the step-up and down converter 42 (FIG. 3) is not operated, and the charge-discharge current is 0. At this time, the inter-terminal voltage Vt is constant at a voltage V1. At the time t1, if the charge-discharge current It rises, since the voltage drop is generated due to the internal resistance R (FIG. 3) of the power storage device 41, the inter-terminal voltage Vt rises from V1 to V2.

During a period from the time t1 to a time t2, if a constant charge-discharge current It flows, the inter-terminal voltage Vt is linearly increased from V2 to V4. If the charge-discharge current It is 0 at the time t2, since the voltage drop is not generated due to the internal resistance R, the inter-terminal voltage Vt falls from V4 to V3. During a period from the time t2 to a time t3, since the charge-discharge current It is 0, the inter-terminal voltage Vt is maintained at a constant voltage V3.

When a lithium ion capacitor or an electric double layered capacitor are used for the power storage device 41 (FIG. 3), the state of charge SOC is represented by the following Expression.

[Expression 1]

$$SOC = \left(\frac{Vo}{Vr}\right)^2 \quad (1)$$

Here, Vr indicates a maximum rated voltage of the power storage device 41, and Vo indicates an open circuit voltage of the power storage device 41.

During the period from the time t0 to the time t1, and during the period from the time t2 to the time t3, since the charge-discharge current It is 0, the inter-terminal voltage Vt coincides with the open circuit voltage Vo. However, during the period from the time t1 to the time t2, since the charge-discharge current It flows, the inter-terminal voltage Vt does not coincide with the open circuit voltage Vo. During the period from the time t1 to the time t2, the open circuit voltage Vo of the power storage device 41 cannot be directly measured.

During the period from the time t1 to the time t2, using the value of the internal resistance R, a calculation value Vop of the open circuit voltage Vo and a calculation value SOCp of the state of charge SOC can be obtained by the following Expression.

[Expression 2]

$$Vop = Vt - R \cdot It \qquad (2)$$
$$SOCp = \left(\frac{Vt - R \cdot It}{Vr}\right)^2$$

At the time t1, the open circuit voltage Vo coincides with the voltage V1 when the charge-discharge current is 0, and at the time of t2, coincides with the voltage V3 when the charge-discharge current is 0. However, at the time t1 and t2, it is found that the calculation value Vop of the open circuit voltage Vo may not coincide with the measured values V1 and V3. Accordingly, the calculation value SOCp of the state of charge SOC obtained using the calculation value Vop of the open circuit voltage Vo is deviated from an actual state of charge SOC. The deviation of the calculation value Vop of the open circuit voltage Vo occurs because the value of the internal resistance R used when the calculation value Vop is obtained using Expression 2 is deviated from the internal resistance R at the present time.

In the embodiment, the internal resistance R at the present time can be more correctly obtained. In addition, using the internal resistance, the state of charge SOC can be more correctly obtained.

The internal resistance R of the power storage device 41 (FIG. 3) can be represented by the following Expression using a measured value Vom of the open circuit voltage Vo, a measured value Vtm of the inter-terminal voltage Vt, and a measured value Itm of the charge-discharge current It.

[Expression 3]

$$R = \frac{Vtm - Vom}{Itm} \qquad (3)$$

Figure 5:
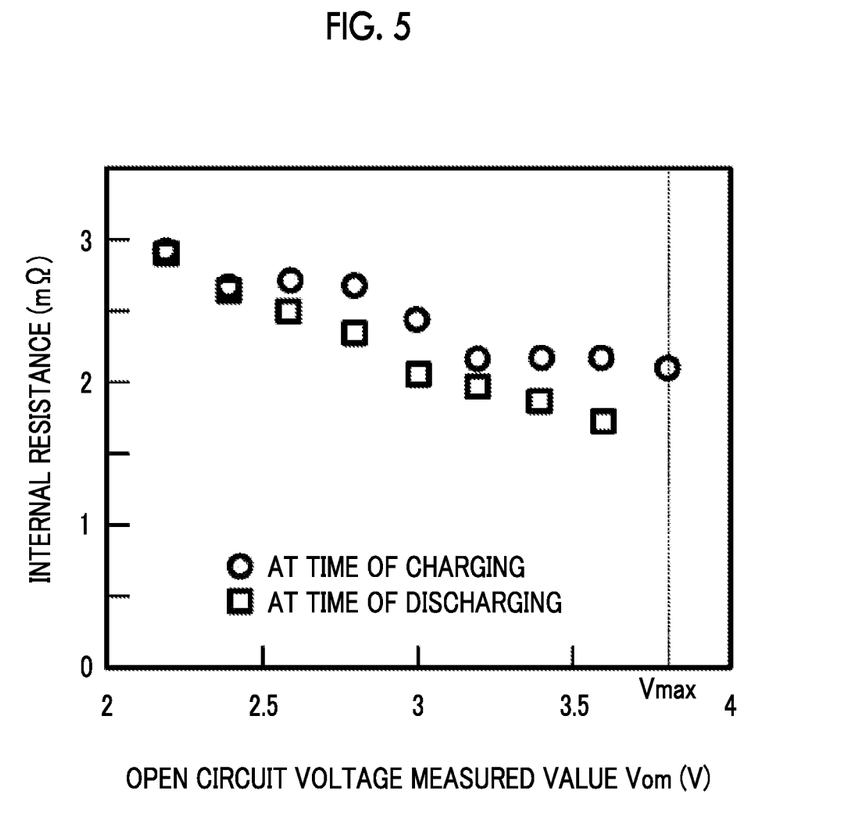
FIG. 5 is a graph showing a relationship between a measured value Vom of the open circuit voltage and an internal resistance R.

FIG. 5 shows the relationship between the measured value Vom of the open circuit voltage and the internal resistance R obtained using Expression 3. A horizontal axis indicates the measured value Vom of the open circuit voltage by a unit "V", and a vertical axis indicates the calculation value of the internal resistance R by a unit "mΩ". The measurements are performed for a short time when the increase of the internal resistance due to degradation of the power storage device can be ignored. Although the change of the internal resistance R can be ignored, it is understood that the calculation value of the internal resistance R is changed depending on the measured value Vom of the open circuit voltage. Moreover, it is understood that the calculation value of the internal resistance R obtained using the inter-terminal voltage Vt and the charge-discharge current It measured at the state of charge does not coincide with the calculation value of the internal resistance R obtained using the inter-terminal voltage Vt and the charge-discharge current It measured at the discharged state.

Accordingly, when the open circuit voltage Vo at the present time does not coincide with the maximum rated voltage Vmax, the value of the internal resistance R obtained in the maximum rated voltage Vmax does not coincide with the value of the internal resistance R at the present time. For example, when the open circuit voltage Vo at the present time is lower than the maximum rated voltage Vmax, the value of the internal resistance R at the present time is higher than the value of the internal resistance R which is obtained at the time of the last maximum rated voltage Vmax. In the embodiment, considering voltage dependence of the internal resistance R, the open circuit voltage Vo, a state of health SOH of the power storage device 41, and the state of charge SOC are obtained.

Figure 6:
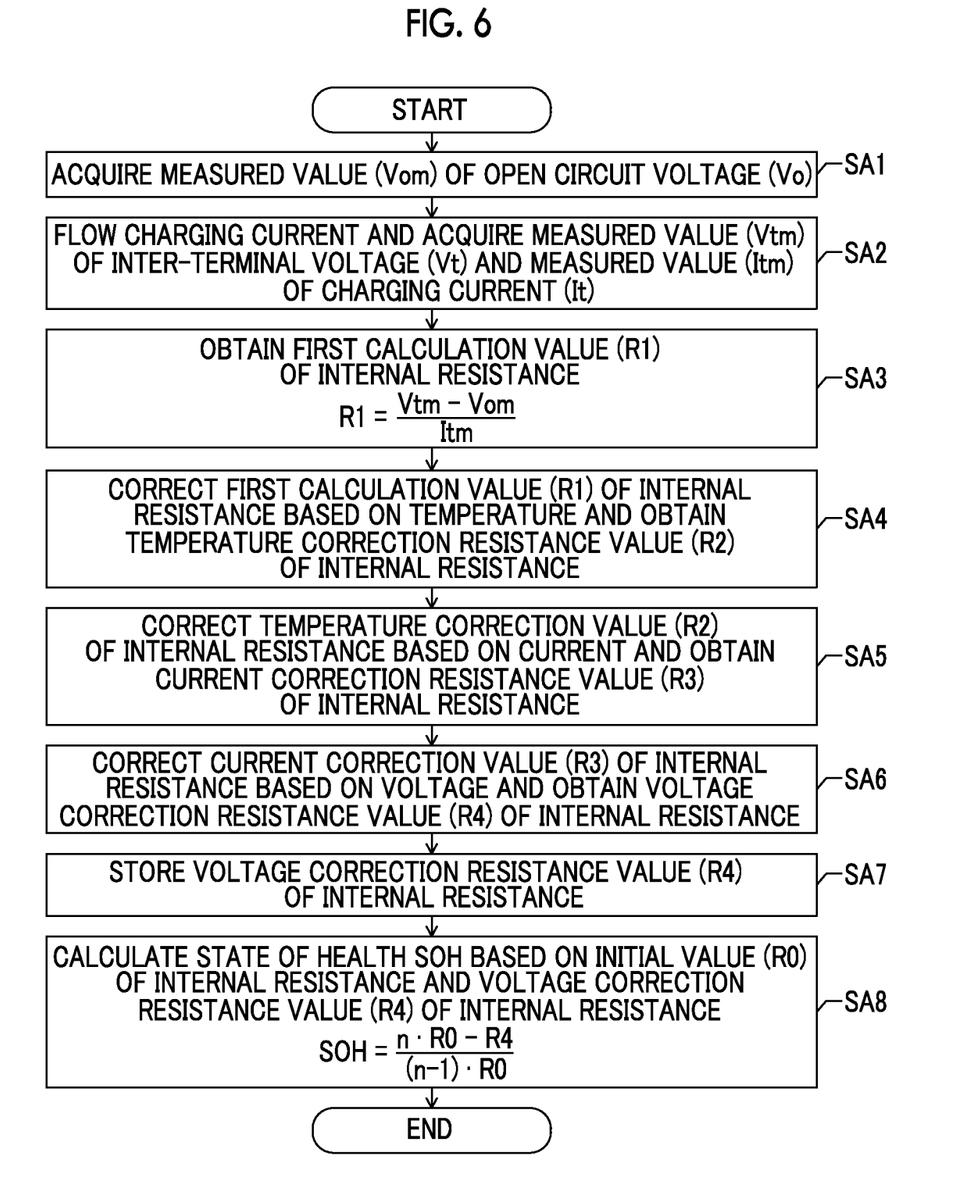
FIG. 6 is a flowchart showing a calculation method of the internal resistance and a state of health according to the embodiment.

FIG. 6 shows a flowchart showing calculation methods of the internal resistance R and the state of health SOH according to the embodiment. In the description below, FIGS. 3 and 4 can be referred to if necessary. Each process of the flowchart shown in FIG. 6 is performed by the controller 90.

In Step SA1, the controller 90 controls the step-up and down converter 42, and the charge-discharge current of the power storage device 41 is set to 0. In this state, the controller 90 acquires the measured value Vom of the open circuit voltage Vo of the power storage device 41 (FIG. 3) from the voltage sensor 47. As an example, if the open circuit voltage Vo is measured at the time t1 of FIG. 4, the voltage V1 is acquired as the measured value Vom of the open circuit voltage Vo.

In Step SA2, the controller 90 controls the step-up and down converter 42 and flows the charging current to the power storage device 41. In the state where the power storage device 41 is charged, the controller 90 acquires the measured value Vtm of the inter-terminal voltage Vt from the voltage sensor 47 and acquires the measured value Itm of the charge-discharge current It from the current sensor 48. For example, at the time t4 shown in FIG. 4, the measured value Vtm of the inter-terminal voltage Vt and the measured value Itm of the charge-discharge current It are acquired. In addition, a discharging current may flow to the power storage device 41.

In Step SA3, a first calculation value R1 of the internal resistance R is obtained using the following Expression.

[Expression 4]

$$R1 = \frac{Vtm - Vom}{Itm} \qquad (4)$$

In Step SA4, the first calculation value R1 of the internal resistance R is corrected based on a temperature, and thus, an internal resistance value after a temperature correction (hereinafter, referred to as a temperature correction resistance value) R2 is obtained. Hereinafter, a method of obtaining the temperature correction resistance value R2 will be described. The internal resistance R of the power storage device 41 is dependent on the temperature of the power storage device 41. Accordingly, when the internal resistance R is obtained, the voltage and the current can be measured in a state where the temperature of the power storage device 41 is a certain reference temperature Tr. However, when the internal resistance R is obtained, it is not realistic to increase or decrease the temperature of the power storage device 41 to the reference temperature Tr.

In the embodiment, at the temperature at the present time, the measured value Vom of the open circuit voltage Vo, the measured value Vtm of the inter-terminal voltage Vt, and the measured value Itm of the charge-discharge current It are acquired. The first calculation value R1 of the internal resistance R obtained using Expression 4 is corrected based on the temperature at the present time, and the value (temperature correction resistance value) R2 of the internal resistance R in the state of the reference temperature Tr is obtained.

Figure 8:
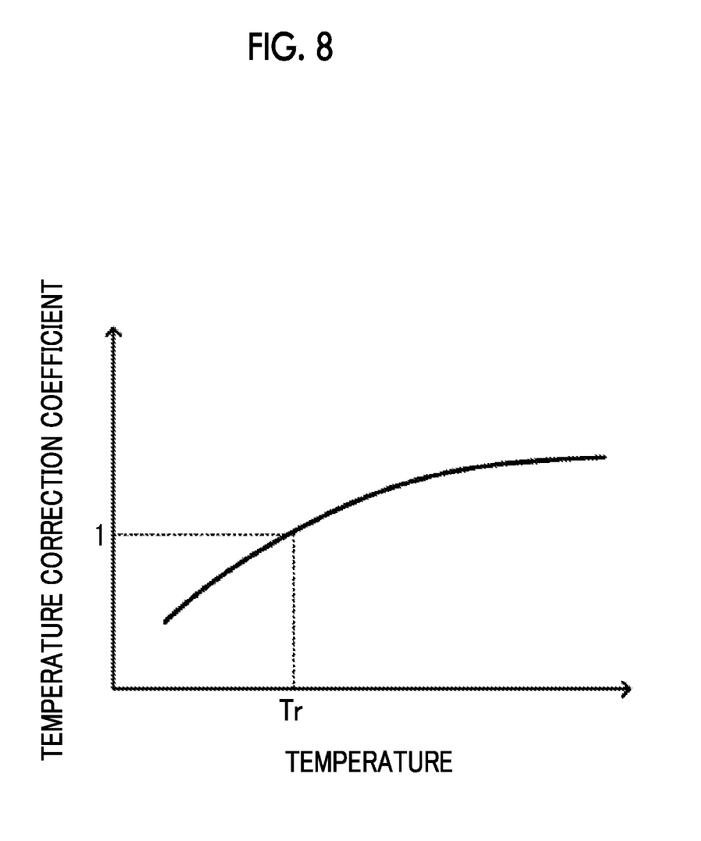
FIG. 8 is a graph showing a relationship between a temperature and a temperature correction coefficient.

FIG. 8 shows a relationship (temperature correction information) between a temperature and a temperature correction coefficient. The relationship is stored in the temperature correction correspondence table storage unit 91 (FIG. 3). The temperature correction coefficient is increased according to the increase of the temperature. This means that the internal resistance R is decreased according to the increase of the temperature of the power storage device 41. The temperature correction coefficient is 1 when the temperature is the reference temperature Tr. The temperature correction coefficient is obtained by applying the measured value of the present temperature to the graph shown in FIG. 8. The measured value of the temperature can be acquired from the temperature sensor 46 (FIG. 3). By multiplying the first calculation value R1 of the internal resistance R by the temperature correction coefficient, the temperature correction resistance value R2 can be obtained.

In the example shown in FIG. 8, in order to obtain the temperature correction resistance value R2 from the first calculation value R1, the temperature correction coefficient which is defined as a function of the temperature is used. In addition, using a correspondence table for deriving the temperature correction resistance value R2 from the first calculation value R1 and the present temperature, the temperature correction resistance value R2 can also be obtained.

In Step SA5, the temperature correction resistance value R2 is corrected based on a current, and thus, an internal resistance value after a current correction (hereinafter, referred to as a current correction resistance value) R3 is obtained. Hereinafter, a method of obtaining the current correction resistance value R3 will be described. The internal resistance R of the power storage device 41 is dependent on the magnitude of the charge-discharge current of the power storage device 41. Accordingly, when the internal resistance R is obtained, the voltage and the current can be measured in a state where the charge-discharge current is a certain reference current Ir. However, when the internal resistance R is obtained during the operation of the working machine, the charge-discharge current may not be equal to the reference current Ir.

In the embodiment, in the state where the charge-discharge current at the present time flows, the inter-terminal voltage Vt and the charge-discharge current It are measured. By correcting the obtained temperature correction resistance value R2 based on the current at the time of the measurement, the value of the internal resistance R (current correction resistance value) R3 in the state of the reference current Ir is obtained.

Figure 9:
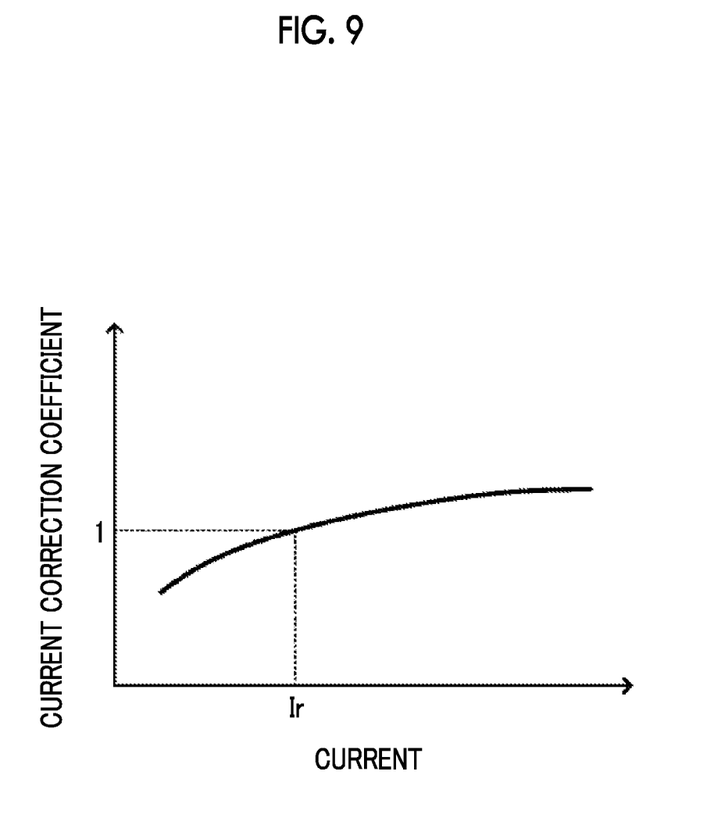
FIG. 9 is a graph showing a relationship between a current and a current correction coefficient.

FIG. 9 shows a relationship (current correction information) between a current and a current correction coefficient. This relationship is stored in the current correction correspondence table storage unit 92 (FIG. 3). The temperature correction coefficient is increased according to the increase of the current. This means that the internal resistance R is decreased according to the increase of the charge-discharge current. The current correction coefficient is 1 when the charge-discharge current is equal to the reference current Ir. The temperature correction coefficient is obtained by applying the measured value of the present charge-discharge current to the graph shown in FIG. 9. The current correction resistance value R3 is obtained by multiplying the temperature correction resistance value R2 by the current correction coefficient.

In the example shown in FIG. 9, in order to obtain the current correction resistance value R3 from the temperature correction resistance value R2, the current correction coefficient which is defined as a function of the current is used. In addition, using a correspondence table for deriving the current correction resistance value R3 from the temperature correction resistance value R2 and the current at the time of the measurement, the current correction resistance value R3 can also be obtained.

In Step SA6, by correcting the current correction resistance value R3 based on a voltage, and thus, an internal resistance value after a voltage correction (hereinafter, referred to as a voltage correction resistance value) R4 is obtained. Hereinafter, a method of obtaining the voltage correction resistance value R4 will be described. As shown in FIG. 5, the internal resistance R of the power storage device 41 is dependent on the magnitude of the open circuit voltage Vo of the power storage device 41. Accordingly, when the internal resistance R is obtained, the voltage and the current can be measured after the open circuit voltage Vo is charged and discharged to a state of a certain reference voltage Vr. However, when the internal resistance R is obtained during the operation of the working machine, it is not realistic to charge and discharge the power storage device 41 to the reference voltage Vr.

In the embodiment, the measured value Vom of the open circuit voltage Vo, the measured value Vtm of the inter-terminal voltage Vt, and the measured value Itm of the charge-discharge current It are acquired by the open circuit voltage at the present time. By correcting the obtained current correction resistance value R3 based on the measured value Vom of the open circuit voltage Vo, the value (voltage correction resistance value) R4 of the internal resistance R in the state of the reference voltage Vr is obtained.

Figure 10:
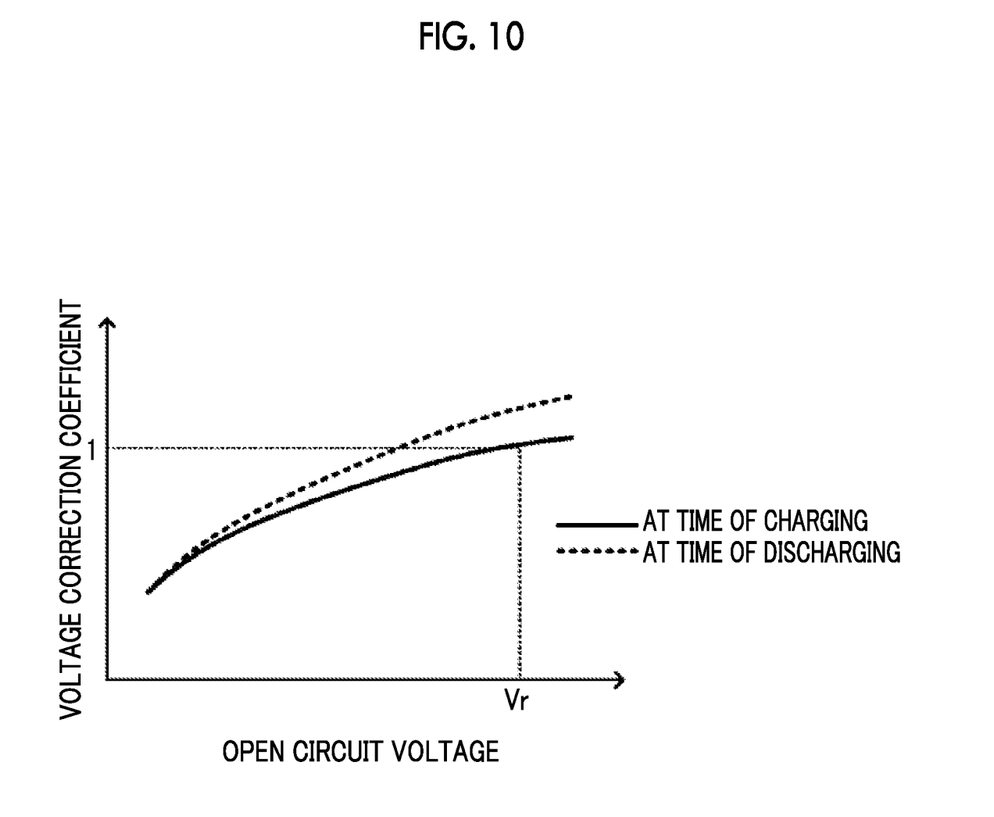
FIG. 10 is a graph showing a relationship between the open circuit voltage and the voltage correction coefficient.

FIG. 10 shows a relationship (voltage correction information) between an open circuit voltage and a voltage correction coefficient. This relationship is stored in the voltage correction correspondence table storage unit 93 (FIG. 3). The voltage correction coefficient is increased according to the increase of the open circuit voltage. This means that the internal resistance R is decreased according to the increase of the open circuit voltage. As shown in FIG. 5, even when the measured values Vom of the open circuit voltage Vo are the same as each other, since the internal resistances are different from each other at the time of charging and at the time of discharging, the voltage correction coefficients also are different from each other at the time of charging and at the time of discharging. If the internal resistance at the time of charging is set to the reference, the voltage correction coefficient at the time of charging when the open circuit voltage Vo is the reference voltage Vr becomes 1.

The temperature correction coefficient is obtained by applying the measured value Vom of the present open circuit voltage Vo to the graph shown in FIG. 10. In Step SA2 (FIG. 6), the value at the time of the charging is adopted as the voltage correction coefficient when the charging current flows, and the value at the time of the discharging is adopted as the voltage correction coefficient when the discharging current flows. By multiplying the current correction resistance value R3 by the voltage correction coefficient, the voltage correction resistance value R4 is obtained.

In Step SA7, the voltage correction resistance value R4 obtained in Step SA6 is stored in the voltage correction resistance value storage unit 94 (FIG. 3).

In Step SA8, the state of health SOH of the power storage device 41 is obtained by the following Expression based on an initial value R0 of the internal resistance R and the voltage correction resistance value R4.

[Expression 5]

$$SOH = \frac{n \cdot R0 - R4}{(n-1) \cdot R0} \quad (5)$$

Here, n indicates a coefficient of the state of health. In the initial state, since the voltage correction resistance value R4 is equal to the initial value R0, the state of health SOH is 1. If the voltage correction resistance value R4 is n times of the initial value R0, the state of health SOH becomes 0. That is, according to degradation of the power storage device 41, the state of health SOH is decreased from 1 to 0. The coefficient n of the state of health is determined based on characteristics of the power storage device 41, status of use, or the like.

In the embodiment, the first calculation value R1 of the internal resistance R is corrected based on the temperature, the current, and the voltage. Accordingly, the voltage correction resistance value R4, which is obtained based on the voltages and currents measured at states of various temperatures, charge-discharge currents, and open circuit voltages, can be compared at the same condition as a condition in which the initial value R0 is obtained. Accordingly, it is possible to obtain the state of health SOH at high accuracy.

In the embodiment, the temperature correction (Step SA4), the current correction (Step SA5), and the voltage correction (Step SA6) are performed with respect to the first calculation value R1 of the internal resistance R. When the voltage and the current are measured, if the temperature of the power storage device 41 is set to be approximately constant and the charge-discharge current is set to be approximately equal to the reference current, the processes of the temperature correction (Step SA4) and the current correction (Step SA5) can be omitted.

In FIG. 6, in Steps SA4 to SA6, the correction according to the temperature, the correction according to the current, and the correction according to the voltage are performed in this order. However, the order of correcting the internal resistance is not limited to this order. Moreover, correction coefficients dependent on the temperature, the current, and the voltage may be obtained in advance. In this case, using the correction coefficients, the internal resistance R4 after correction which is corrected by the temperature, the current, and the voltage may be directly obtained from the first calculation value R1 of the internal resistance.

Figure 7:
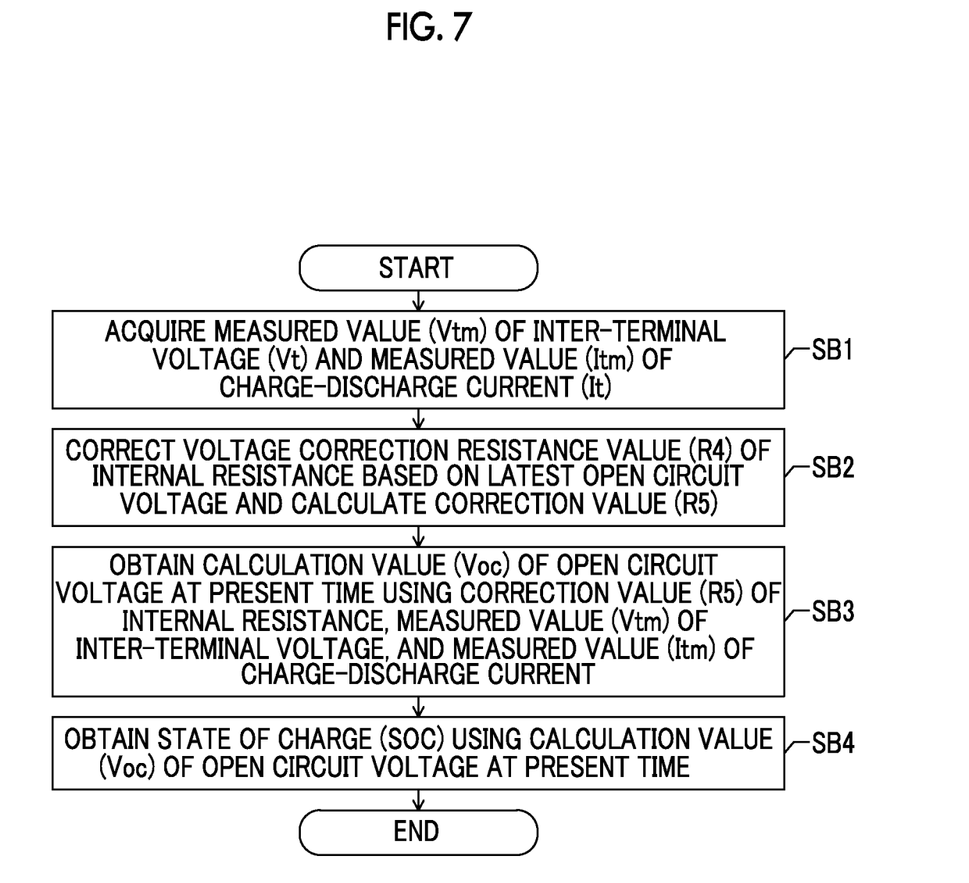
FIG. 7 is a flowchart showing the calculation method of the charging state according to the embodiment.

FIG. 7 shows a flowchart of a calculation method of the state of charge SOC according to the embodiment. In the description below, FIGS. 3 and 4 can be referred to if necessary. Each process of the flowchart shown in FIG. 7 is performed by the controller 90.

In Step SB1, the controller 90 acquires the measured value Vtm of the inter-terminal voltage Vt from the voltage sensor 47 and acquires the measured value Itm of the charge-discharge current It from the current sensor 48.

In Step SB2, the voltage correction resistance value R4 stored in the voltage correction resistance value storage unit 94 is corrected based on the open circuit voltage Vo which is obtained last, and thus, the correction value R5 is obtained. Hereinafter, a method of obtaining the correction value R5 will be described. The voltage correction resistance value R4 stored in the voltage correction resistance value storage unit 94 is a value under a condition in which the open circuit voltage Vo is equal to the reference voltage Vr (FIG. 10). In Step SB2, the voltage correction resistance value R4 is corrected to the value in the open circuit voltage Vo at the present time. However, since the open circuit voltage Vo at the present time is unknown, the correction is performed based on the last open circuit voltage Vo.

By applying the last open circuit voltage Vo to the graph of the voltage correction coefficient shown in FIG. 10, the voltage correction coefficient is obtained. Since the voltage correction resistance value R4 is obtained by multiplying the internal resistance R at the present time by the voltage correction coefficient, by dividing the voltage correction resistance value R4 by the voltage correction coefficient, the correction value R5 of the internal resistance R at the present time can be obtained.

As an example, at the time t4 shown in FIG. 4, the voltage V1 measured at the time t1 can be adopted as the last open circuit voltage Vo. At the time t5, as the last open circuit voltage Vo, the calculation value Voc of the open circuit voltage Vo calculated based on the voltage and the current at the time t4 can be adopted. The calculation value Voc of the open circuit voltage Vo is obtained by the following step SB3. When Step SB2 is performed at the time t5, since the Step SB3 has been performed in advance at the time t4, in Step SB2 performed at the time t5, the calculation value Voc of the open circuit voltage Vo obtained at the time t4 can be used.

In Step SB3, the calculation value Voc of the open circuit voltage Vo at the present time is obtained based on the correction value R5 of the internal resistance R, the measured value Vtm of the inter-terminal voltage Vt, and the measured value Itm of the charge-discharge current It. The calculation value Voc of the open circuit voltage Vo can be obtained by the following Expression.

[Expression 6]

$$Voc = Vtm - R5 \cdot Itm \quad (6)$$

In Step SB4, the state of charge SOC is obtained using the calculation value Voc of the open circuit voltage Vo at the present time. When the maximum rated voltage of the power storage device 41 is indicated by Vr, the state of charge SOC can be obtained by the following Expression.

[Expression 7]

$$SOC = \left(\frac{Voc}{Vr}\right)^2 \quad (7)$$

In the embodiment, in Step SB2, since the internal resistance R is corrected based on the open circuit voltage Vo which is obtained last, the calculation value Voc of more correct open circuit voltage Vo can be obtained. Since the accuracy of the calculation value Voc of the open circuit voltage Vo is increased, the calculation accuracy of the state of charge SOC is also increased.

In the embodiment, in the state where the charge-discharge current It flows as at the time t5 of FIG. 4, the state of charge SOC can be more accurately obtained without measuring the open circuit voltage Vo. The state of charge SOC of the power storage device 41 (FIG. 3) is used for the controls of the motor generator 31 and the rotary electric motor 22 shown in FIG. 2. During the operation of the working machine, since the state of charge SOC can be more accurately obtained, accuracy of the controls of the motor generator 31 and the rotary electric motor 22 can be increased.

The operation calculating the state of charge SOC of the power storage device 41 is performed before the generating operation or the assist operation of the motor generator 31, or before the power running operation or the regenerative operation of the rotary electric motor 22, and thus, the entire control of the shovel can be appropriately performed.

In the embodiment, in Step SB2, the voltage correction resistance value R4 is corrected based on the calculation value Voc of the last open circuit voltage Vo. In addition, the correction may be performed based on the temperature of the power storage device 41 and the measured value Itm of the charge-discharge current It. The correction based on the temperature can be performed using the temperature correction coefficient shown in FIG. 8. The correction based on the measured value Itm of the charge-discharge current It can be performed using the current correction coefficient shown in FIG. 9.

In the embodiment, the electric double layered capacitor, the lithium ion capacitor, or the like is used for the power storage device 41 (FIG. 3). The calculation method of the internal resistance according to the embodiment may be applied to a secondary battery such as a lithium ion secondary battery. In addition, the calculation method of the state of charge SOC according to the embodiment may be applied to a power storage device in which the state of charge SOC has a characteristic dependent on the open circuit voltage. For example, the calculation method of the state of charge SOC according to the embodiment may be applied to a secondary battery in which the state of charge SOC is likely to be dependent on the open circuit voltage.

It should be understood that the invention is not limited to the above-described embodiment, but may be modified into various forms on the basis of the spirit of the invention. Additionally, the modifications are included in the scope of the invention.

What is claimed is:

1. A working machine comprising:
an electric motor configured to drive a drive target and generate electricity;
a power storage device;
a charge-discharge control circuit which is configured to control charging and discharging of the power storage device and is connected to the electric motor; and
a controller configured to control the charge-discharge control circuit,
wherein the controller obtains a calculation value of an internal resistance of the power storage device based on a measured value of an open circuit voltage of the power storage device, and a measured value of an inter-terminal voltage and a measured value of a charge-discharge current when the power storage device is charged and discharged, and obtains a correction value of the internal resistance by correcting the calculation value of the internal resistance based on the measured value of the open circuit voltage.

2. The working machine according to claim 1, further comprising:
an inverter configured to drive the electric motor; and
a DC bus line which is connected to the charge-discharge control circuit and the inverter.

3. The working machine according to claim 1,
wherein the controller performs a control using the correction value of the internal resistance.

4. The working machine according to claim 1,
wherein the controller stores correction information to obtain the correction value of the internal resistance from the measured value of the open circuit voltage and the calculation value of the internal resistance, and obtains the correction value of the internal resistance based on the calculation value of the internal resistance, the measured value of the open circuit voltage, and the correction information.

5. The working machine according to claim 4,
wherein correction information at the time of charging and correction information at the time of discharging are stored as the correction information, the correction information at the time of charging is used in a case where the power storage device is charged when the calculation value of the internal resistance is obtained, and the correction information at the time of discharging is used when the power storage device is discharged.

6. A working machine comprising:
an electric motor configured to drive a drive target and generate electricity;
a power storage device configured to supply electric power to the electric motor;
a charge-discharge control circuit which is configured to control charging and discharging of the power storage device and is connected to the electric motor; and
a controller configured to control the charge-discharge control circuit,
wherein the controller stores a value of an internal resistance at the time of a reference voltage of the power storage device,
wherein the controller obtains a charging state of the power storage device based on a measured value of an inter-terminal voltage and a measured value of a charge-discharge current when the power storage device is charged and discharged, and the value of the internal resistance at the time of the reference voltage, and
wherein the controller obtains a correction value which is obtained by correcting the value of the internal resistance at the time of the reference voltage based on a calculation value of the last open circuit voltage of the power storage device, obtains the calculation value of the open circuit voltage at the present time based on the correction value, and obtains the charging state of the power storage device based on the calculation value of the open circuit voltage at the present time.

7. The working machine according to claim 6,
wherein the controller controls the electric motor and the charge-discharge control circuit based on the obtained charging state of the power storage device.

* * * * *